US012423325B2

(12) United States Patent
Moosa et al.

(10) Patent No.: US 12,423,325 B2
(45) Date of Patent: Sep. 23, 2025

(54) METHODS AND SYSTEMS FOR OPTIMIZING SCATTERED DATABASES AND ACCESSING COMPLEX DATA STRUCTURES FOR END-USER INTEGRATED PLATFORMS

(71) Applicant: INNOVATION TECHNICAL SOLUTION S.A.O.C (INNOVATEQ), Muscat (OM)

(72) Inventors: Riyadh Moosa, Muscat (OM); Wim Servaes, Muscat (OM); Ashok Kumar, Kanyakumari (IN); Vijayaragu Radhakrishnan, Muscat (OM); Abdul Rahman Rafeeq, Muscat (OM)

(73) Assignee: INNOVATION TECHNICAL SOLUTION S.A.O.C (INNOVATEQ), Muscat (OM)

( * ) Notice: Subject to any disclaimer, the term of this patent is extended or adjusted under 35 U.S.C. 154(b) by 0 days.

(21) Appl. No.: 18/696,450

(22) PCT Filed: Sep. 30, 2021

(86) PCT No.: PCT/IB2021/058996
§ 371 (c)(1),
(2) Date: Mar. 28, 2024

(87) PCT Pub. No.: WO2023/052821
PCT Pub. Date: Apr. 6, 2023

(65) Prior Publication Data
US 2025/0005043 A1 Jan. 2, 2025

(51) Int. Cl.
*G06F 16/28* (2019.01)
*G06F 16/23* (2019.01)
(Continued)

(52) U.S. Cl.
CPC ........ *G06F 16/283* (2019.01); *G06F 16/2386* (2019.01); *G06F 16/2474* (2019.01);
(Continued)

(58) Field of Classification Search
CPC .. G06Q 10/04; G06Q 10/067; G06Q 10/0631; G06Q 10/20; G06F 16/273;
(Continued)

(56) References Cited

U.S. PATENT DOCUMENTS

| 7,627,611 B2 | 12/2009 | Gusciora |
| 10,019,297 B2 | 7/2018 | Helmich et al. |

(Continued)

OTHER PUBLICATIONS

Gray J., "The next database revolution", In Proceedings of teh ACM SIGMOD international conference on Management of data (SIGMOD), Association for Compouting Machinery, New York, NY, USA, pp. 1-4, Jun. 13, 2004.
(Continued)

*Primary Examiner* — Etienne P Leroux
(74) *Attorney, Agent, or Firm* — CAESAR RIVISE, PC

(57) ABSTRACT

The present invention relates to the field of digitally accessing, modeling and optimizing scattered 'big-data' from various assets having complex and dynamic physical relationships. The present disclosure also relates to a system and method for supporting version-of-the-truth from multiple data sources and for multiple disciplines. It helps organizations that possess various physical assets that are been utilized by multiple user groups and through a period of time to optimize operations, conduct surveillance and manage complex business processes related to their valuable assets and equipment. The invention is built with an open architecture to connect to various corporate databases combining real-time and relational data. The system employs exception-based surveillance, sophisticated queries, and no-code methods to automatically detect deviations in asset perfor- (Continued)

mance from optimal conditions, and flag them to the right users, at the right time, and in the right way. The present invention also allows monitoring the status and performance of equipment and facilities by presenting its findings through intuitive dashboards and automated workflows. In addition, a mobile version of the present invention is developed to help users execute day to day work as well as manage and maintain equipment and assets more efficiently.

4 Claims, 14 Drawing Sheets

(51) Int. Cl.
    *G06F 16/24*     (2019.01)
    *G06F 16/2458*     (2019.01)
    *G06F 16/25*     (2019.01)
    *G06F 16/27*     (2019.01)
    *G06F 16/58*     (2019.01)
    *G06Q 10/067*     (2023.01)

(52) U.S. Cl.
    CPC .......... *G06F 16/252* (2019.01); *G06F 16/273* (2019.01); *G06Q 10/067* (2013.01)

(58) Field of Classification Search
    CPC .............. G06F 16/252; G06F 16/2386; G06F 16/2474; G06F 16/283; E21B 41/00; E21B 43/00; E21B 2200/20
    See application file for complete search history.

(56) References Cited

U.S. PATENT DOCUMENTS

| | | | |
|---|---|---|---|
| 10,198,159 | B2 | 2/2019 | Ziegler et al. |
| 10,360,217 | B2 | 7/2019 | Ziegler |
| 11,038,694 | B1* | 6/2021 | Kleinman ............. H04L 9/3236 |
| 2004/0172305 | A1* | 9/2004 | Soerensen ............. G16H 10/60 |
| | | | 705/3 |
| 2010/0287185 | A1* | 11/2010 | Cras .................. G06F 16/24528 |
| | | | 707/769 |
| 2015/0112597 | A1* | 4/2015 | Laing ..................... E21B 44/00 |
| | | | 702/9 |
| 2019/0265971 | A1* | 8/2019 | Behzadi ................ G06F 16/254 |
| 2020/0264937 | A1* | 8/2020 | Rao ......................... G06F 9/542 |
| 2020/0265329 | A1 | 8/2020 | Thomsen et al. |
| 2021/0021899 | A1* | 1/2021 | Lindsey ............ H04M 15/8214 |
| 2021/0234849 | A1* | 7/2021 | Lamb ...................... H04L 63/04 |
| 2023/0259105 | A1* | 8/2023 | De Caigny ...... G05B 19/41865 |
| | | | 700/28 |

OTHER PUBLICATIONS

Camposano J.C. et al., "Seven Metaphors to Understand Digital Twins of Built Assets", in IEEE Access, vol. 9, pp. 27167-27181, Feb. 9, 2021.

* cited by examiner

FIG. 03-A
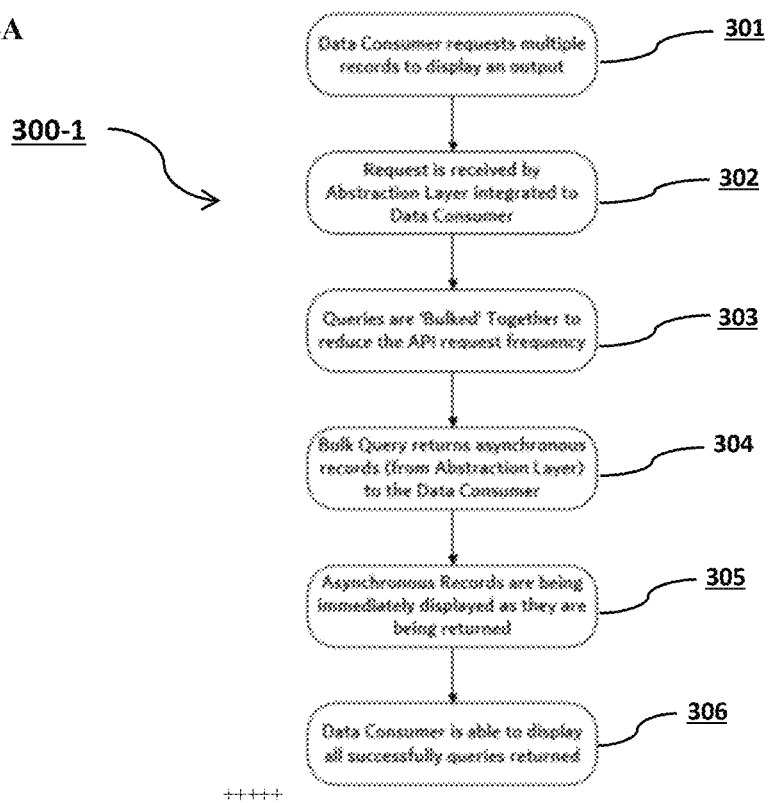
FIG. 03-B
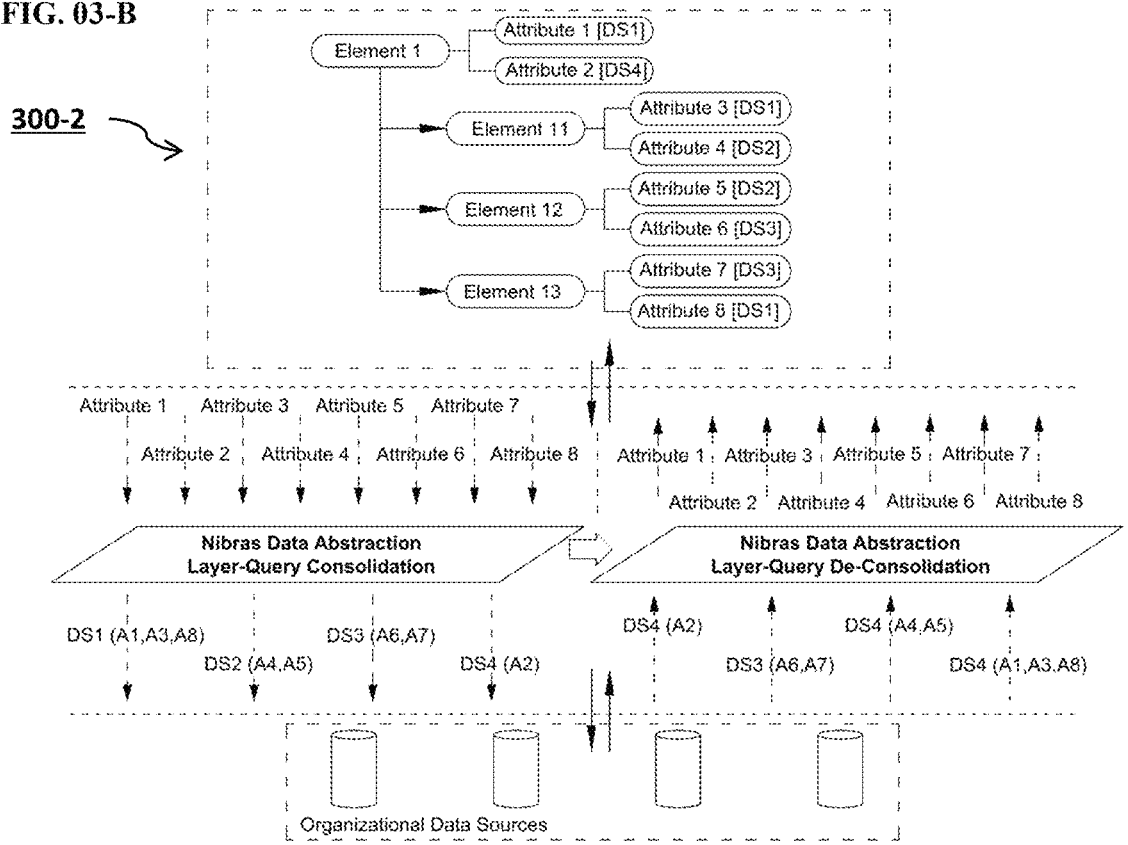

FIG. 04-A
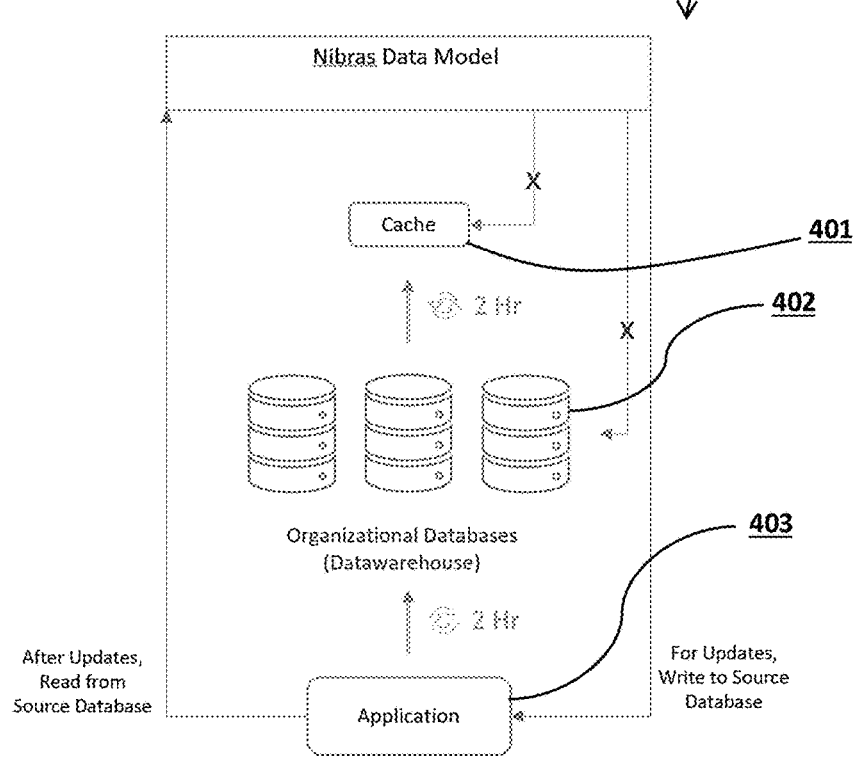
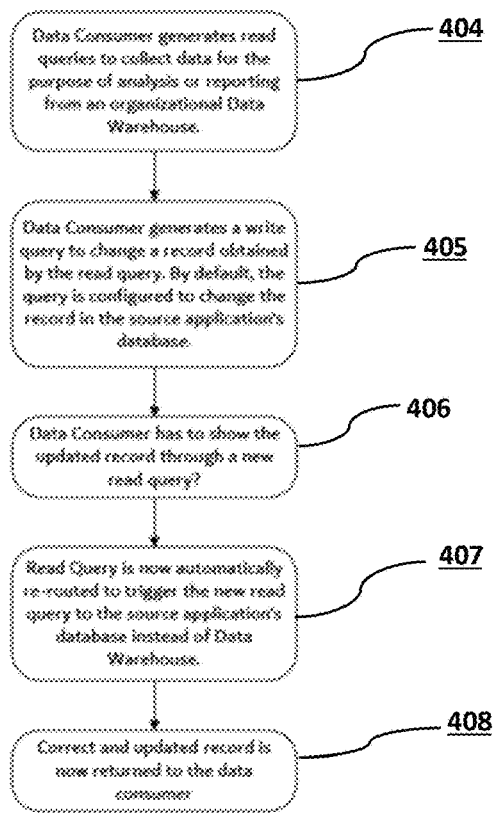

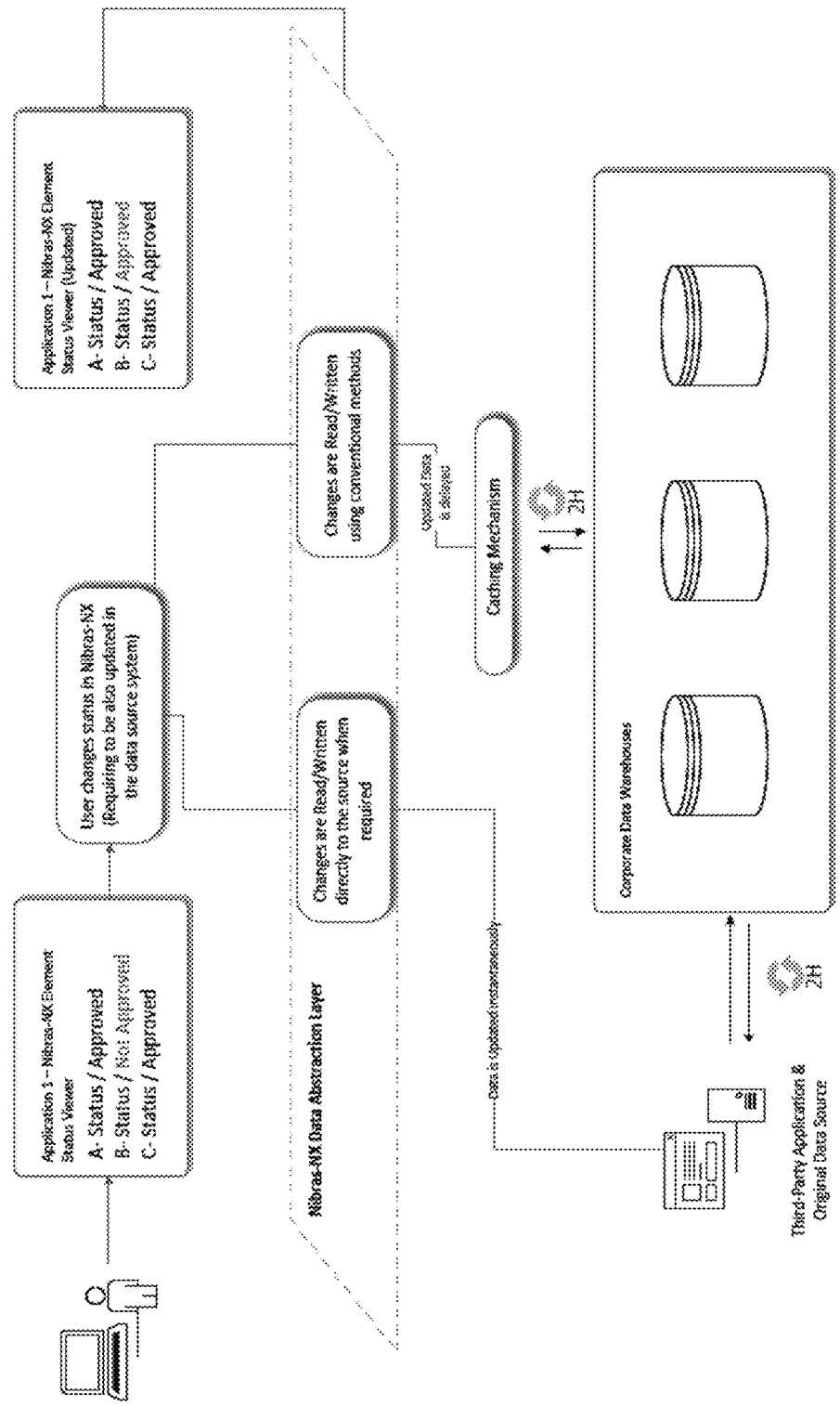
FIG. 04-B

FIG. 05-A (Prior Art)
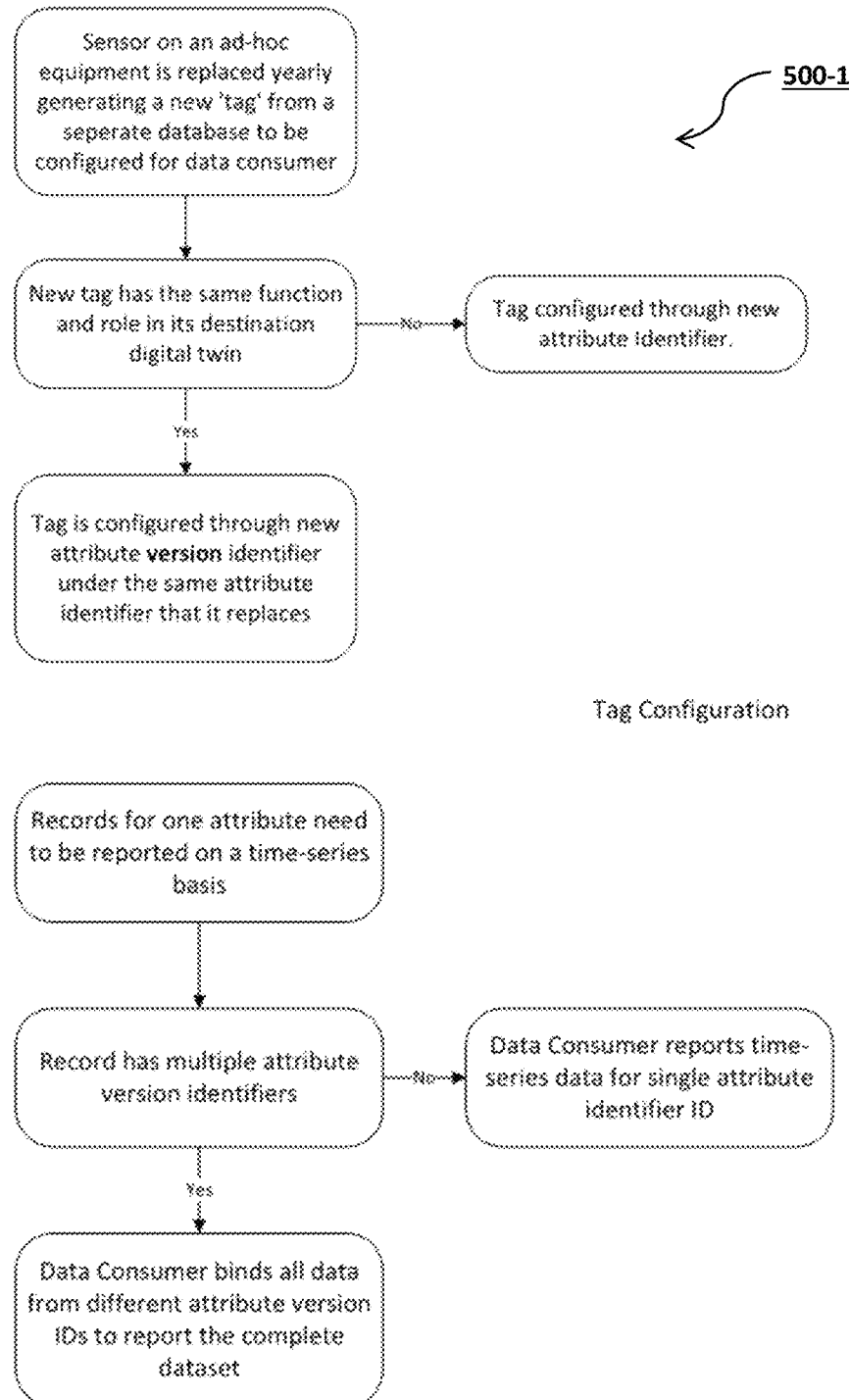
Tag Configuration
Combining Tags in Analysis and Reporting

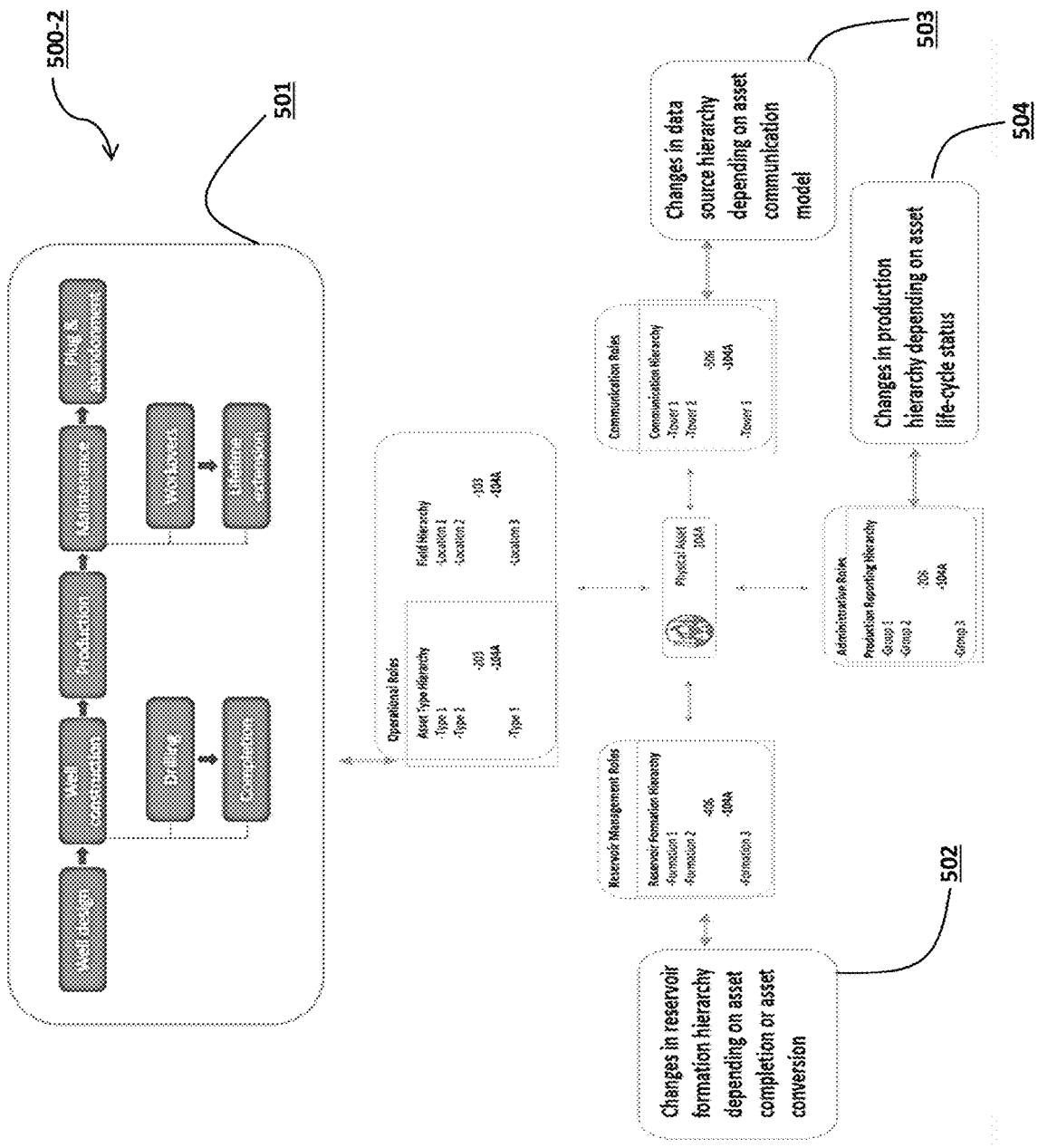
FIG. 05-B

FIG. 08-A
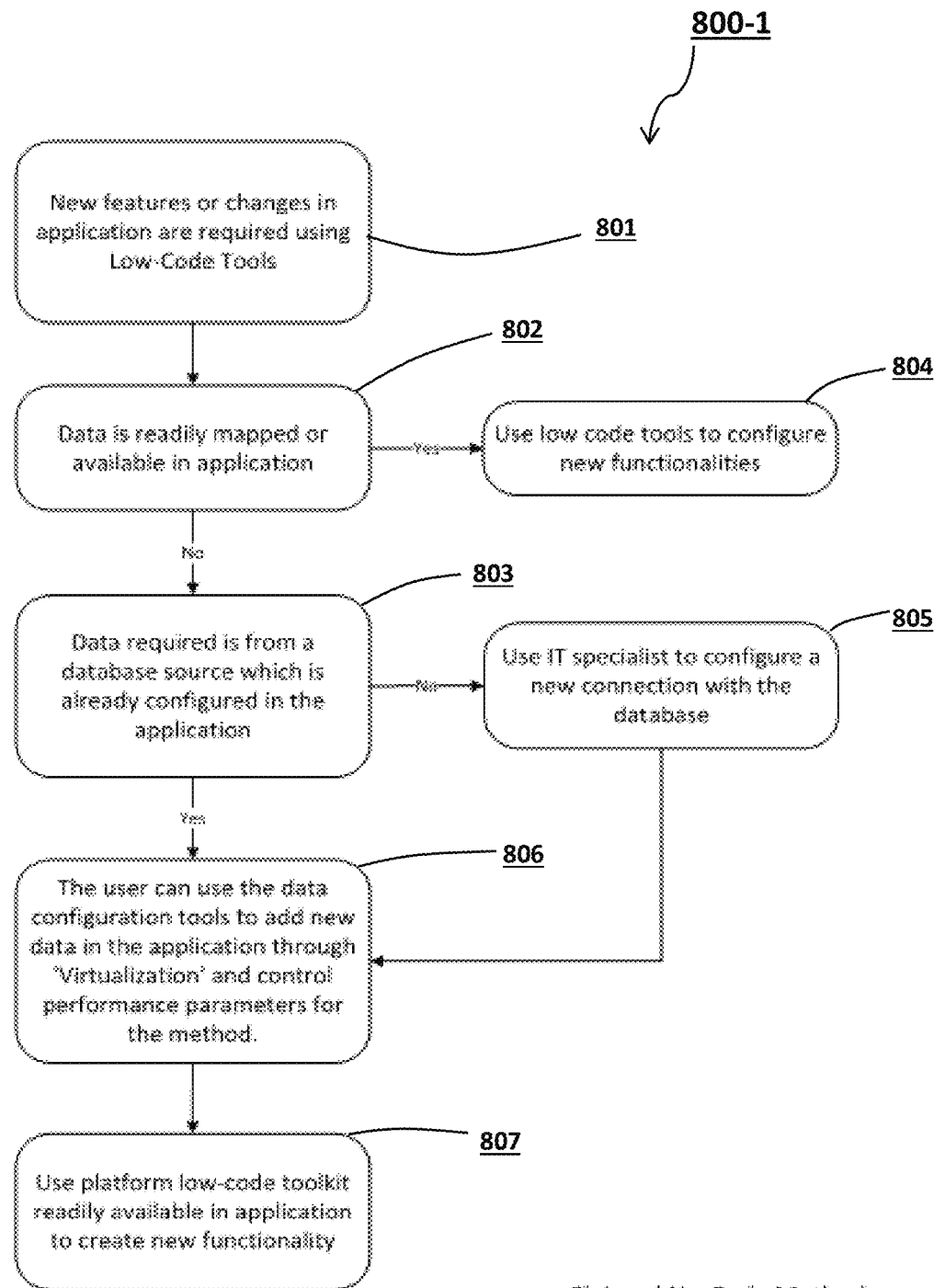

FIG. 08-B

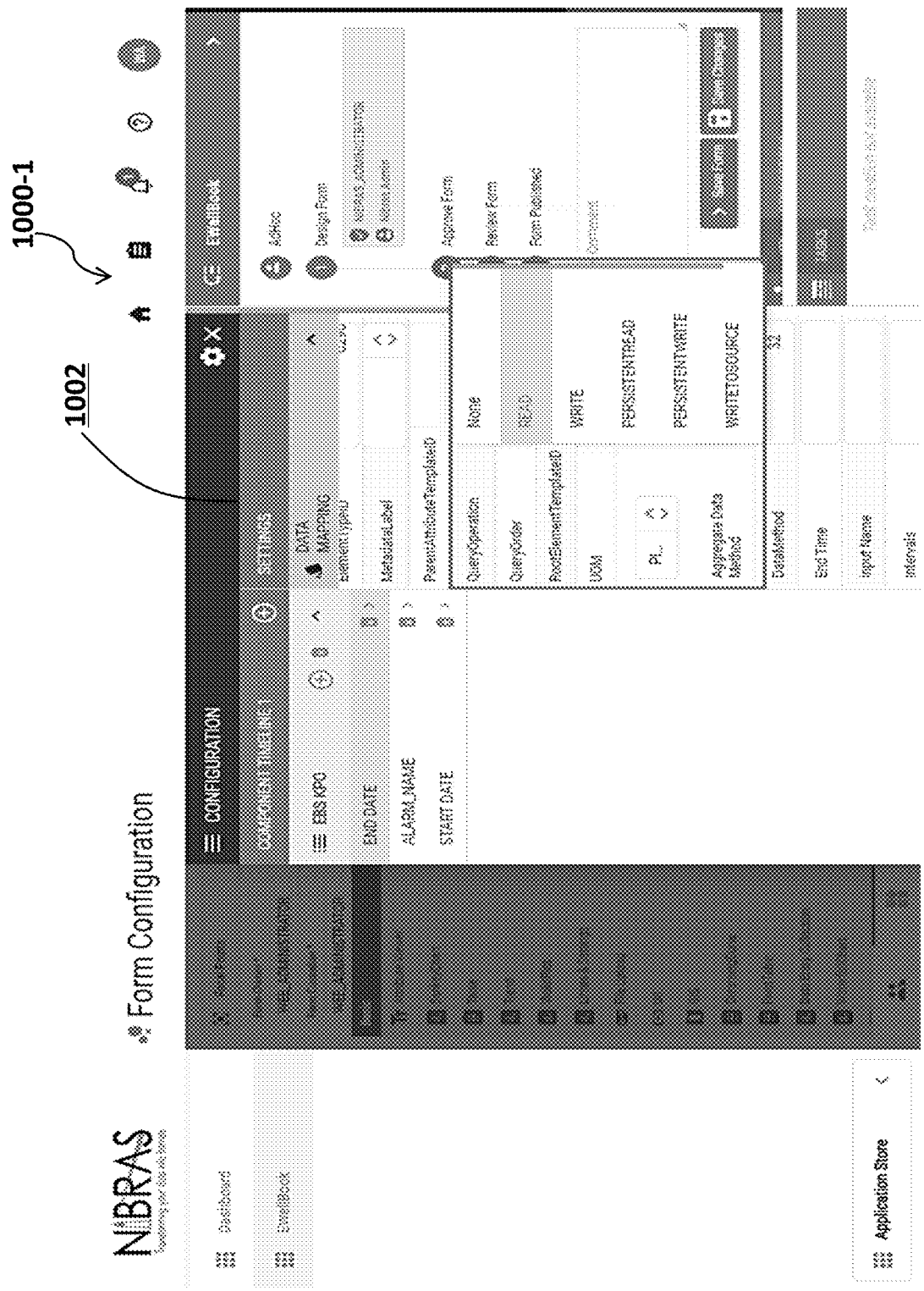
FIG. 18-A

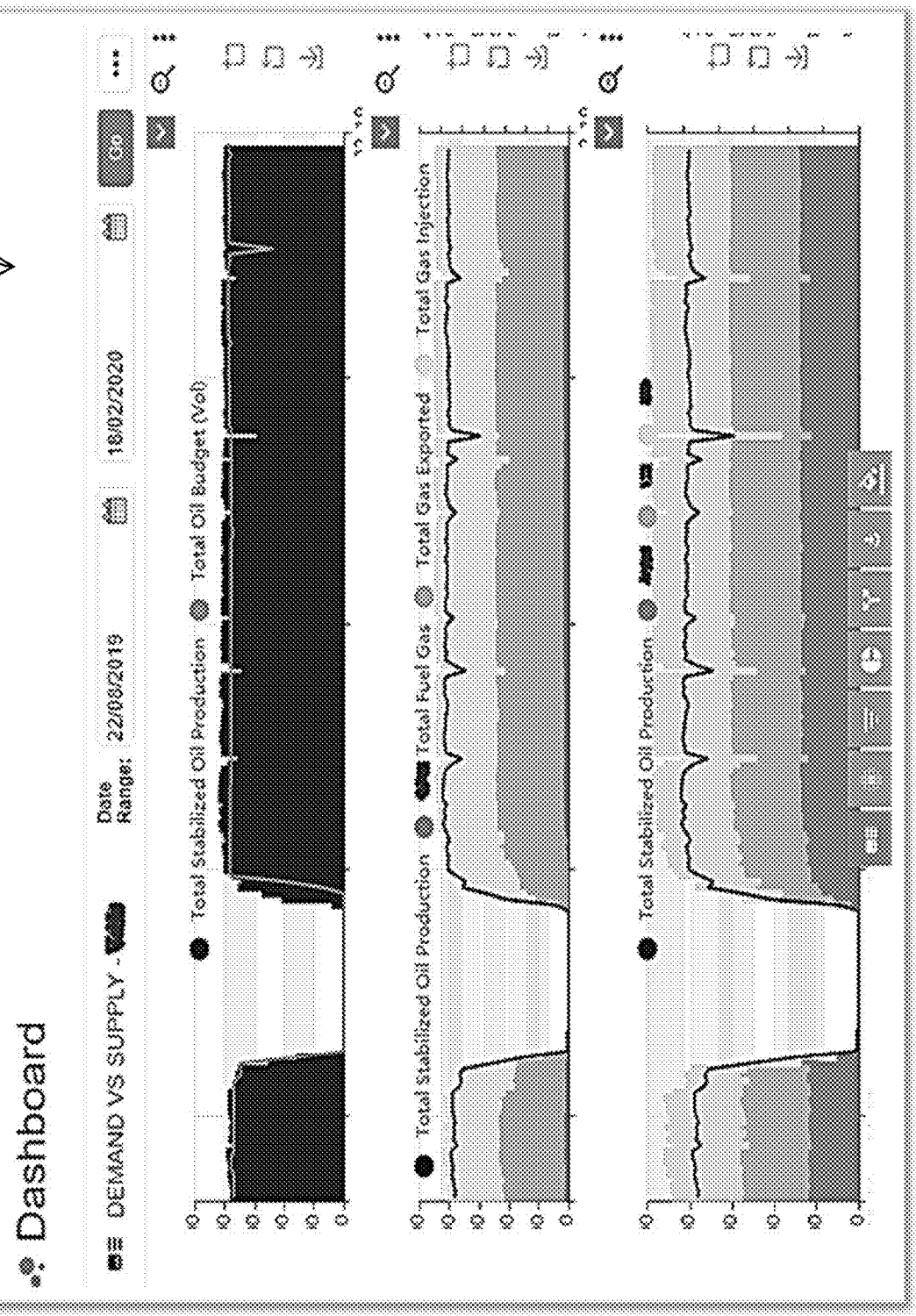
FIG 18-B

METHODS AND SYSTEMS FOR OPTIMIZING SCATTERED DATABASES AND ACCESSING COMPLEX DATA STRUCTURES FOR END-USER INTEGRATED PLATFORMS

CROSS-REFERENCE TO RELATED APPLICATIONS

This application is a U.S. National Phase Application of PCT/IB2021/058996, filed Sep. 30, 2021, the contents of which are incorporated herein by reference in their entireties for all purposes.

BACKGROUND OF THE INVENTION

Field of the Invention

This disclosure relates to the field of accessing, modeling and optimizing scattered data from various physical assets. The present disclosure also relates to a system and method for supporting and optimizing access to scattered data systems functioning with a plurality of geographically scattered physical assets. The present disclosure relates to a system and method which supports a single version-of-the-truth from multiple I.T systems and for multiple disciplines.

Description of the Related Art

While the prior art includes numerous database management systems, none of the existing systems are able to integrate several features into one digital twin of asset groups. Features like managing real-time databases and relational data sources simultaneously to offer insights into the management of equipment that operate in industries such as oil and gas were not found in the prior art. A number of existing Enterprise Resource Planning (ERP) solutions that are able to do this at an administrative level whereby financial, supply chain, human resource and other similar disciplines can be integrated; however, technical asset integration using features claimed in this patent remains untouched. This is mainly because of the high-technical complexity of creating a data abstraction layer which is capable of managing data output from multiple specialized software and managing this 'big-data' in a manner which enables users to have a reliable and holistic overview of the various components of their production systems. Also, when this integration is achieved through conventional methods, it would require coding efforts to integrate multiple nodes of their organizations' IT infrastructure layers, while the present inventions enable business process owners and subject matter experts to create new integrated functionalities within the platform using no-code interfaces.

Several solutions offer to create static hierarchies of various organizational assets that work by 'tagging' data from other existing data sources, software or databases. U.S. Pat. No. 10,198,159B2 discloses a data integration system which accesses a time-series database and an asset relational database. The asset relational database is comprised of a plurality of asset nodes related in a hierarchical structure. Each asset node may represent a physical asset in an industrial setting. The data integration system displays a graphical representation of the hierarchical structure of the asset relational database, receives user input selecting an asset node from the hierarchical structure, and displays a hierarchical search template based on the selected asset node. Another prior art references namely U.S. Pat. Nos. 7,627,611B2 and 10,360,217B2 disclose method for distributed database replication and a computer-implemented method for data integration, respectively.

The methods and systems described in the prior art might work for small and manageable data sources, however handling continuous flow of millions of real-time data points, i.e. 'big-data', will always present a challenge. In addition, in industries such as oil and gas, it is important to understand the complex relationship that exists between certain datasets, and such traditional methodologies as presented by prior art and existing industrial solutions are not efficient in handling such hierarchies and complex relationships. To address this issue, consider such a system where there are two wells (201-A and 202-A) that are connected through a single flowline to an equipment (301-A) and there is a pressure sensor to read data on said flowline. By using commingled wells, in traditional systems, the two wells are connected to the same flowline. The flowline pressure sensor output value has a digital 'tag' that is being managed by any third-party system. The tag then should manually be added twice under each well in a traditional static hierarchy. The problem with such approach is that it provides users with an incomplete/inaccurate digital twin structure. Through this method, if a problem occurs with well 202-A which affects flowline data and the user is visualizing data for well 201-A, the user will not have the complete understanding of what is happening to the flowline and won't be able to conclude on a potential root-cause. On the other hand, the present invention is able to create these connections and provide users with a better overview of relationships between multiple data points. Furthermore, the tools and data-sources for monitoring the two wells may be different and may not be integrated. This is a very simple example, but it becomes much more complex when it comes to generating dynamic hierarchies and dynamic tags that become the basis for other applications such as generating dynamic limit diagrams to show production system constraints which need to take such complexity into account to produce reliable outputs.

Although the previously mentioned prior art address some issues, nonetheless, there is a need for addressing the problem of information scattering as explained previously. There is a need to provide an integrated solution that offers one useful digital twin of asset groups that can optimize and make use of the 'big-data' inputs that are generated from various scattered data sources to generate comprehensive and optimized results that can be centralized for multiple disciplines towards achieving a single version-of-the-truth. It is known that data generated from oil and gas wells and equipment are scattered across organizational databases and from different software sources and stakeholders, which presents another challenge as well; users require data to be accessed quickly and efficiently, without needlessly duplicating data by importing through traditional methods such as Extract, Transform, Load (ETL) processes and by instead virtualizing data through a unique data abstraction layer conceptualized for the purpose of resolving these challenges.

SUMMARY OF THE INVENTION

The present disclosure pertains to a digital platform designed to help companies in various industrial sectors optimally manage their physical assets. It helps such organizations to optimize operational capabilities and expand integrated asset management functionalities. Firstly, this is applicable when similar asset types need to be monitored or managed as homogeneous groups although they are inherently heterogenous due to their different life-cycles, parameters, systems, configurations, linked processes, vendors or operating conditions. Secondly, there are scenarios where multiple disciplines or organizational departments can benefit from a centralized collaboration system and a single version-of-the-truth in their operational data. Thirdly, for scenarios where production system connections, linkages and networks between asset nodes are highly-complex and yield variable contributions to other nodes within the overall system and nodes belong to multiple hierarchies. Another example of scenario includes when scheduled & unscheduled processes, notifications, exceptions and visual management for a single asset are scattered in multiple IT systems and need to be triaged, analyzed and prioritized holistically.

The invention is built with an open architecture which is able to connect to various corporate relational databases and real-time databases (through virtualization). The integrated data is then accessible to a built-in and centralized exception-based surveillance (EBS) analytical engine, a workflow management engine and a set of visual reporting tools and systems configured through a no-code environment.

The system employs exception-based surveillance (EBS) to automatically detect abnormal deviations in asset parameters from optimal conditions, and flag them to the right users, at the right time, and in the right way. Multiple EBS exceptions triggered internally or by external sources are prioritized to isolate a single most relevant exception as to avoid multiple exceptions for a single asset/element to avoid redundant exceptions being raised to users.

The invention employs a workflow management engine to manage business processes which can be linked to managing exceptions, conducting guided scheduled tasks or unscheduled ad-hoc guided human processes. Workflows can also be triggered to guide designated users in making changes to the data-model without requiring the input of IT specialists through the no-code functionalities which includes for example, adding new assets to the digital-twin.

No-code functionalities enable designated business users to make changes to the data model and mapping for queries and templates, hierarchies, exception-based surveillance analysis attributes, visual tool configurations, managing asset static and dynamic operating envelopes, workflow process configurations, exception-based surveillance fault-trees and user-role mapping.

These platform features are only possible when applying the methods presented in the context of this invention as the claims presented are new methods which were not previously applied for purposes such as the digital platform summarized herein.

The present invention allows the monitoring of the status and performance of equipment and facilities by presenting its findings through intuitive dashboards and reports. In addition, one of the key features of the present invention is the 'industrial mobility'. A mobile version of the present invention is developed to help engineers and working staff execute their work as well as manage and maintain equipment and assets more efficiently. For instance, this invention can be utilized for upstream oil and gas operations such as exploration, engineering, finance as well as other downstream activities. By using this EBS solution, hundreds of oil and gas wells can be monitored simultaneously in a brief period (i.e. few minutes), which leads to significant savings on operation linked to surveillance costs and resources.

The present invention also focuses on establishing value for the staff and users who are working in the field, away from corporate headquarters, and that are using this invention on daily basis therefore expanding the user base beyond the higher-management or the specialists. By applying this methodology, a more holistic approach can be followed, which results in significant user adoption for organizations. The real benefit comes from having an agile platform that provides the capabilities to enable the integration of people, data, processes and technology to achieve business objectives.

BRIEF DESCRIPTION OF THE DRAWINGS

The invention will be described with reference to the accompanying drawings, which illustrate a preferred embodiment of the present invention without restricting the scope of the invention thereof, and in which:

FIG. 03 (A and B) shows the system and method for optimizing query performance for when accessing scattered and large datasets. When populating data for a platform functionality, a single bulk data request is made to the data integration layer which consolidates the parameters per data source, fetches and streams the data back to the data consumer as it is made available by the data source. This method enables multiple asynchronous events to be streamed to the data consumer faster than the conventional method, all the while avoiding the delays when the data consumer is retrieving the slowest responding data source(s). FIG. 03. B shows the query consolidation process for complex hierarchies.

FIG. 04 (A and B). show the system and method for optimizing scattered data access. The same parameter can be retrieved from (and written to) different layers in the organization's information technology architecture depending the context and purpose. Very often, there are data warehouse systems in place and potentially even more caching layers to have a better performance of the data retrieval. However, requirements to update data can generate some complexity. If the update is done on the same layer as where the data was read (in instances other than the source database), then the data is not being immediately reflected in the original source causing mismatches in the data across the different nodes which could potentially lead to confusion. If the data is updated on the original source, a delay will be there to reflect the change in the different layers, as these different layers are not necessarily featured to force a cache refresh on demand. Hence, temporarily, reading can be configured to happen from the source database until data is reflected in the subsequent layers.

FIG. 05 (A and B) show system and method for optimizing physical asset data modelling. Assets evolves and change to different phases which gives them changing parameters during different periods of time. In addition, some of the data might be available for the full life cycle of the asset but the data source or analysis logic might change over time which can lead to technical limitations for functionalities such as when a long-term historical asset review is being done.

FIG. 08 (A and B) show a complete set of tools to enable different no-code functionalities to cover the entire cycle of creating an application. The data abstraction layer elevates complex and coded data abstraction layers to the end-users so they can configure data virtualization accordingly without needing to replicate data in a database within the no-code environment as the existing approach would. The data abstraction layer can virtualize and connect to external databases for no code environments without needing to import or store the data within the platform in the first place. An interface is available to the users in order to configure/manage these connections and queries resulting in a complete end-to-end no code environment/platform.

FIG. 18 (A and B) provide screenshots that offer an overview of the extent of the present invention query configuration options that are available to the end-user. Users can use the interface to choose from a multitude of pre-established connections available in the data-mapping row. FIG.-18 B shows a visual report that was created using the no-code platform toolkit.

DETAILED DESCRIPTION OF THE INVENTION

Reference to the accompanying figures is made to provide with a more comprehensive understanding for various methods and apparatuses disclosed herein. The supplementary drawings are considered to be graphical representations made for the purpose of explanation and to provide with examples and demonstrations only, and, therefore, are not meant for identify dimensions, sizes nor define/limit the scope of the disclosed invention.

Specific terms have been used for the purpose of providing clear description of this invention, however these terms are not meant for defining nor limiting the scope of the invention are used for referring to specific structure of the various embodiments.

Figure 1:
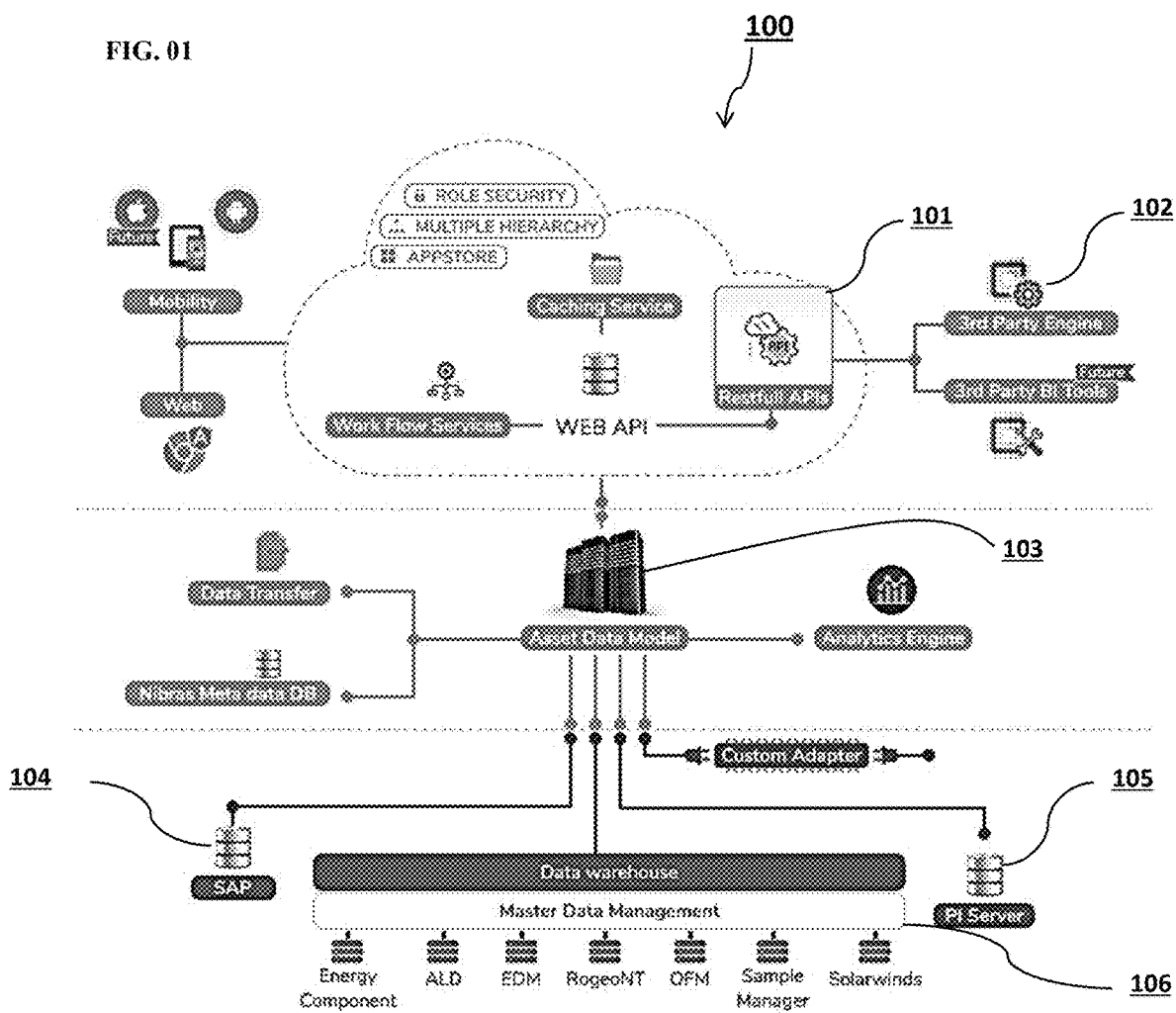
FIG. 01 are visual representations of data source, Asset Data Model (current invention) and corresponding user interfaces. Asset Data Model (ADM) is a digital twin of the physical assets retrieving and writing-back data to various corporate databases, which were established to serve specific purposes. By integrating corporate databases in the ADM, rich analysis can be done on the asset digital twin through different tools such as: (a) Exception Based Surveillance; (b) Human Workflows & Business Process Management; and (c) Dashboards & Reports. The data is also made accessible to other third-party systems through 'Representational State Transfer Application Programming Interface' (RESTful API). The platform can be configured to write-back and read third-party nodes or source databases to ensure a single version-of-the-truth is maintained across an organization's I.T landscape which has been included to the integrated asset data model.

The embodiments of the present invention may be implemented in a database integrated system (100) such as that is shown in FIG. 01. The Asset Data Model or ADM (103) is a digital twin of the physical assets retrieving data from other corporate databases (106), which was established to serve specific purposes. By combining corporate databases in the ADM (103), rich analysis can be done on the asset digital twin through different tools such as: (a) Exception Based Surveillance; (b) Workflows & Business Process Management; and (c) Dashboards & Reports. The data is also presented to other users through 'Representational State Transfer Application Programming Interface' (RESTful API) (101). ADM (103) standardizes units and parameter names for cases where information is gathered from multiple sources. It also supports the standard Rational Database Management System (RDBMS) technologies as well as more proprietary interfaces (105) for real-time data, SAP 104 for financial/maintenance data and other RESTful services from third-party specialist systems (102).

For a large number of records, the same parameter might come from different databases (106) featuring different connection strings; in such instances, the data abstraction layer brings can be configured to bring them back to a common parameter's setting so that any data consumer can process data systematically without being affected by the existing heterogenous corporate infrastructure. Therefore, units and parameter names in the source databases are being standardized within the platform. In turn, this makes it possible to view aggregated production data having different units (from multiple data sources) in one integrated visualization tool. Units of measurements can be set without needing to make changes to the query configurations. The back-end queries will be dynamically built up based on the data request. Different units of measurement (UOM) from different data sources (106) are converted to the standardized UOM convention as specified by the configuration of the data consumer. The physical asset's digital-twins are template-based to allow for enormous number of query configurations to be easily replicated in a 'big-data' management context. Elements that are being configured through different templates over time will have different versions so that historical data retrieval will automatically switch between these different versions and different template configurations. This enables support for an assets' life-cycle management. For instance, an oil well may initially be classified under exploration hierarchies and follow a data template model that is aligned to those requirements at the time. Once the asset becomes handed-over to operations and becomes a producer well, the same asset' template will be changed to reflect its producer status. The datasets generated and gathered from such a well differs drastically between these two phases. Furthermore, during the operation phase, it can initially begin as a free-flowing well, but then be converted to different artificial lift types. Throughout the span of this life cycle, wells remain the same, as an asset and element ID, but the parameters, versions and data collected differ significantly during its life-cycle and may require relevant historical data in some contexts.

In another preferred embodiment of the present invention (300-1), when populating data for a platform function, a single bulk data-request (301) to the platform's data abstraction layer is made (302), which consolidates the parameters per data source (303), fetches and streams the data back to the data consumer (304) as it is made available by the data source (305). This method (300-1) enables multiple asynchronous events to be streamed to the data consumer faster than the conventional method, all the while avoiding the delays when the data consumer is retrieving the slowest responding data source(s). When a request is sent (301) to the server (containing many data points), that request is split by data source, and data is rendered to client asynchronously (305). This means that it can populate data for one record, while the other records wait for server response to populate. In turn, this means the user's screen will not freeze when a database is missing or down, resulting in a responsive screen regardless of the downtimes or slow databases. Conventionally, such challenges would be addressed by employing methods such as 'buffering' as to allow sufficient time for databases to return records when there is a difference between the rate at which data is received and the rate at which it can be processed. However, for the suggested method (300-1), it's the other way around whereby retrieving data can be disconnected from the response speed for client rendering (records that can be populated immediately are made available, while records from data sources with slower response rates will be populated at their own pace). FIG. 03-B diagram shows an example of the process and methods (300-2) used within the present invention's data abstraction layer to enable the stated functionalities to work.

In another preferred embodiment of the present invention is a data virtualization method which is an approach to database management that if implemented correctly, should be unique and a single source of truth. Data virtualization can efficiently bridge data across data warehouses (106), data marts, data lakes and third-party data sources without having to create a whole new integrated physical data platform. Existing data infrastructure can continue performing their core functions while the data virtualization layer leverages the data from those sources. This aspect of data virtualization makes it complementary to all existing data sources and increases the availability and usage of enterprise data. The data abstraction layer integrates these virtualization methods to make that data visible to a client application's end-user through data which pertains to advanced query management principles that are being applied and integrated to an end-user platform layer instead of the conventional corporate database management layer(s) where such methods are typically used, which brings advanced data management capabilities one step closer to the end-users. Unlike the traditional extract, transform, load ("ETL") process, the data remains in place, and real-time access is given to the source system for the data. This reduces the risk of data errors, and avoids the need for computing resources linked to moving and storing data around that may never be used, and it does not attempt to impose a single data model on the data. The technology also supports the writing of transaction data updates back to the source systems. To resolve differences in source and consumer formats and semantics, various abstraction and transformation techniques are used. Data virtualization may also be considered as an alternative to ETL and data warehousing. Data virtualization is inherently aimed at producing quick and timely insights from multiple sources without having to embark on a major data project with extensive ETL and data storage.

Figure 9:
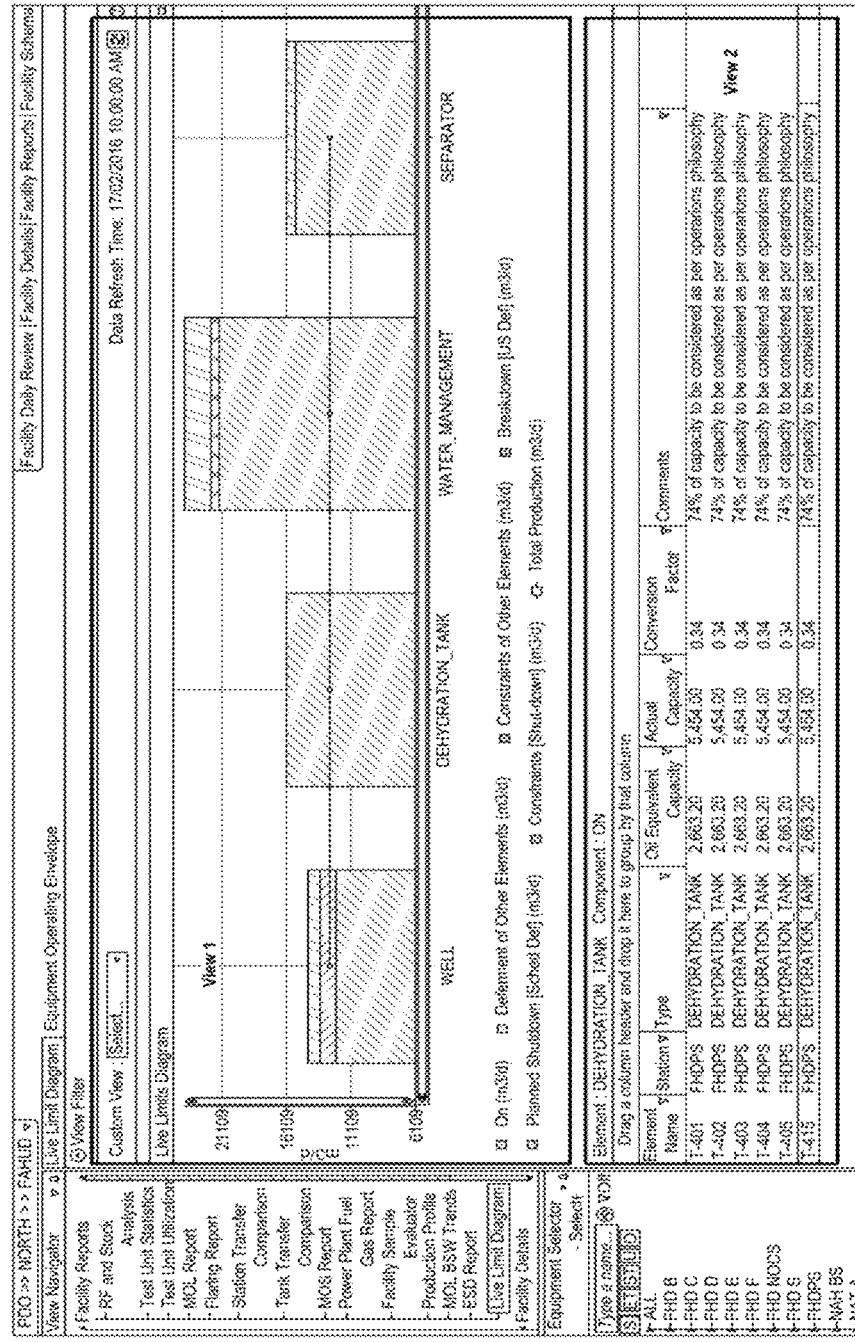
FIG. 09 shows an example of an aggregated production system's capacity and deferments taking into consideration complex asset relationships and demonstrates the powerful impact that an accurate digital twin can have by providing an overview of all the possible sources of deferments into one central location, regardless of the software used, the type of asset, or the source of the data (team/discipline/field/group). Filters are also being applied and data that is accessed are limited to the roles with the appropriate credentials.

Another preferred embodiment of the present invention is the ability to efficiently combine data from a wide-variety of scattered organizational data-sources. The limit diagram is one visual reporting tool example which requires a consideration for deferments that occur when an asset within a complex integrated production network has a production interruption of wells, units, trains or platforms caused by an incident. Instances of deferments are typically stored in an hydrocarbon allocation database and are used to maintain records of deferment events. The present invention enables users to manage, visualize, edit, read, and/or write these data points as they affect other software applications/databases within the present invention or other third-party software. The digital twinning capabilities that are featured in the present invention allows users to update connections (data-mappings) in one place and have the impact replicated across the other related platform functionalities (which are designed to act as integrated asset management system of different organizational disciplines/existing IT infrastructure) and automate the data-gathering and validation processes. FIG. 09 shows an example of deferment (900) of 'Other elements' clearly demonstrating the powerful impact that an accurate digital twin can have by provide an overview of all the possible sources of deferments into one central location, regardless of the software used, the type of asset, or the source of the data (team/discipline/field/group). Through this insight, users are able to visualize the deferment event's impact on their integrated production capacities dynamically. Filters are also being applied and data that is visualized are limited to the roles with the appropriate credentials.

In another preferred embodiment of the present invention, the data abstraction layer does not store any data, instead, it points and reads data from third-party databases. Therefore, when corrections need to be established, the platform enables users to make the changes to records directly at the data source as to ensure that changes are reflected in the platform, but also for any other system consuming the source data. Although this might hinder the process of automatically and continuously getting an updated data, yet it provides the assurance for a single version-of-the-truth. To reinforce this principle, the data model is also exposed through RESTful APIs so that data consumption is not limited to the users of the present invention only, but also for third-parties and data owners and their privileged data consumers.

In a preferred embodiment of the present invention, a computer implemented method for data collection, integration and presentation is disclosed. The method comprises providing data warehouse connectors, a data abstraction layer, a data integration layer, and a graphical user interface, wherein a set of data is exchanged between said data warehouse (106) and said data abstraction layer, and between said data abstraction layer and said data integration layer; configuring collected data points into digital-twins representing physical assets; combining queries into bulk queries to reduce the request frequency to application programming interfaces of third-party systems; enabling the presentation of multiple asynchronous events and streaming of said events to the data consumer; and displaying a graphical representation of said multiple asynchronous events using said graphical user interface.

Another preferred embodiment of the present invention is that when a query for a specific parameter fails, automatic fallback queries are configurable to continue data retrieval from alternative backup databases. This supports data warehouse systems when shuts-downs accidentally occur and, therefore, the fallback query will bypass the data warehouse to automatically re-direct to the source database. In addition, reading and writing queries can be configured to point to different databases. For example, when a data warehouse system is between the original third-party data source and the platform and applications of presented invention, reading operations can be done on the data warehouse system while writing operations will can be configured to point directly to the third-party data source system.

In another preferred embodiment of the present invention, the same parameter can be retrieved from (and written to) different layers in the information technology architecture depending the context/purpose. Often, there are data warehouse systems in place and potentially even more caching layers to stabilize system performance of the different corporate databases. However, these caching mechanisms can increase complexity when records need to be updated or amended. If the update is done on a level other than the original data-source, the data may be impacted by the different refresh frequency of the caching mechanisms that may exist between the layers and lead to data mismatches which could potentially lead to incorrect query reading operations as these different layers are not necessarily featured to enable a cache refresh on-demand. Hence temporarily, reading should happen from the source database until data is reflected in the upper layers. For instance, in oil and gas, well test results are being read from a hydrocarbon allocation database typically within a data warehouse system which may feature caching mechanisms between layers. Writing to the data warehouse is not necessarily updating the data back into the source database system; hence, writing back to the source database becomes a necessity to reflect the changes. Thereafter, all the reports using this data should show this updated information; however, there is a delay due to different refresh frequencies. In these occasions, it can be configured to also re-direct read queries to the source database (401).

In the context of information technology architectures, featuring multiple layers/tiers, sometimes it is required to write something back to database and that could affect other parameters that needs to be read back. Normally reading happens from the top (i.e. Data warehouse). But then, if you need to write something, and changing a value impacts other values which are calculated at the source database, it is required to run a 'refresh' of other layers to get the new value (402). This is why the updated value in data warehouse cannot be retrieved yet, as there is an update delay. This can be avoided by writing and reading directly from the source application for the same value or the same parameter.

In addition, the present invention has multiple connection to different databases, which can be dynamically 'toggled' to read/write for different circumstances and contexts. This concept is applied to the context where the user can configure dynamic query rules for virtualizing data that are driven by operational requirements (faster data refresh rates) in addition to fail-safe features. An example of the previous feature (400-2) is what is presented in FIG. 04-B, in oil and gas wells which demonstrates the impact on the data depending on where it is being read/written. In some isolated scenarios where this is required, a user wanting to change the data point 'B-Status/Not Approved' to 'B-Status/Approved' would traditionally encounter issues when the data is not being overwritten directly in the source database. This is due to the number of layers that can exist between the source data and the consumer which can cause delays due to the logic of various systems such as caching mechanisms to manage overall systems performance. As shown in FIG. 04-A and explained previously, here, the third-party tool (well test tool) would interface with the corporate data warehouse (402) to write data on the "hydrocarbon database" (could be any other database) which resides in the corporate data warehouse (402). From there, the EC database can synchronize the data with the third-party application (403) which hosts the original data source. The third-party application (403) may also have its own caching mechanism (401) in place which could delay furthermore the whole process.

FIG. 18-A shows the various Query Operation options available for users to choose from (1000-1). The difference between "Write" and "WRITE TO SOURCE" is demonstrated in the previous diagram discussed. Depending on how the operations are configured in this screen, the data will be 'consumed' by the software differently. Ultimately, the intent of these functions is to ensure the right equilibrium between system performance (managing 'big-data') and system functionality is constantly optimized to the specific contexts in which data is required. FIG. 18-B illustrates an example of the output operations query options use in the context of a visual report (1000-2) configured by the user. The configuration screen (1002) previously shown in FIG. 18-A eventually leads to this output (notwithstanding other steps in the process). The accurate and efficient population of data for such visual representations requires thousands upon thousands of data points residing in scattered and multi-layered data warehouses and systems and requires this complex integration of data management tools such as this claim to be manageable without IT personnel involvement (no-code environment).

In a preferred embodiment of the present invention, a computer implemented method (400-1) for data collection, integration and presentation is disclosed. The data consumer further comprising: providing (404) a set of read and write queries; generating (405) a read query (406) to collect data from scattered organizational data sources to provides analysis and reports; generating a write query to change the records obtained by said read query wherein such query is configured to change the records in the source application database; showing updated record through a new read query;

re-routing said read query automatically to trigger (407) the new read query to the source application's database instead of data warehouse; and returning corrected and updated (408) record to the data consumer.

In a preferred embodiment of the present invention, a method of managing physical assets involved into different phases of their life-cycle is disclosed. In industries that consists of operational changes and stages, physical assets evolve into different phases, which gives them either more or less data during their operational life-cycles. Some of the data might be available for the full life-cycle of the asset but other data may change over time. This is a potential problem if a long-term analysis is needed.

For example, in the oil and gas industry, a new well which is been drilled begins it's by being identified as an element or asset in the financial systems whereby limited data is recorded. Then, it goes into an operational phase where it may begin as a free-flowing producer well and then, can be changed to take different artificial-lift types required into account. (Each of these phases involves different data-sources and attributes). Eventually the well might be converted into an injector or observation well until the end of its lifetime. During this entire cycle, the asset model will tag data linked to the physical hole in the ground. Using pump efficiency analysis as an example, these parameters can only be found during the period when an artificial-lift system was physically applied while the pump efficiency calculations themselves will furthermore vary according to the type of artificial-lift that was applied. Conversely, design data must be available during the entire life-cycle of the well. In another example, the long-term analysis of a reservoir is considered, whereby a well might be converted from a producer to an injector and where plotting an iVRR (Voidage Replacement Ratio) plot would require combining both datasets seamlessly. The platform's data abstraction layer makes it possible to combine production data which is available for a period of time with injection data from a different period duplicating what is physically happening to the physical well. Similarly, there will be data available for a specific business process which is only relevant while a process is active and within the context of this process. As shown in FIG. 05-B (500-2), the physical asset always remains the same regardless of the discipline, but it can be dynamically managed to reflect the life-cycle status of the asset and it's changing data sources without losing track of the historical data which belonged to that 'fix' element/asset.

Source control and versioning where files are checked-in file and override each other while maintaining a record is another example where this invention can be utilized. Typically, different versions are active in different periods of time providing either different datasets through different channels or multiple datasets from different data sources. In traditional versioning, most of the time a specific version is taken then either a new version is created, or a roll-back occurs to previous versions, while in the present invention, versions are being combined through the data-model. When that model changes over time for any reasons (i.e. replacing a sensor, replacing a tag, changing the data-model, changing the data source of the tag etc.), the present invention can aggregate the various versions in order to generate complete functions such as aggregated trends. This is beneficial when users want to see historical data (i.e. periods between today and 3 years ago), to add historical context which helps understand the complete asset's lifecycle. This is achieved by maintaining a record of all versions and by creating a data abstraction layer capable of managing this data in the context of other critical platform functionalities. For example, when the platform analyses historical trends to predict asset failures, it must be capable of taking changes in versions into account for the platform to return a reliable output and avoid misleading datasets. For example, a physical asset's pressure sensor's state changed three times over the course of three years; in year one, there was a pressure sensor, in year two this pressure sensor was replaced with a different type of sensor and in year three, the pressure sensor's tag configuration was changed in the third-party source database to reflect a change in asset type. The link to these three historical events or changes in life-cycles would have been otherwise lost without a unique data abstraction method which is capable of effectively treating the pressure sensor's function as a fix element that can have multiple or changing input sources to be tracked over time.

In a preferred embodiment of the present invention, a computer implemented method for data collection, integration and presentation is disclosed. The method comprises of: recording changes to data points that represent a plurality of physical assets in an event relational database; accessing said event relational database to generate new tags to physical assets replacements; verifying whether new tags have the same function and role as those stored in the data warehouse; configuring said new tags through a new attribute version identifier when new tags have same function and role as those stored in the data warehouse, and binding all data from different attribute versions identifiers to report the complete dataset; and configuring said new tags through a new attribute identifier when new tags do not have same function and role as those stored in the data warehouse, and reporting changes to time series data points for single attribute identifier.

In the present invention, a digital-twin for physical assets is created through data templates to ensure standardization and efficient configuration. The digital twin consists of a root element and can have multiple layers of child templates, which are either mandatory or optional and can be dynamic in their number. The template rules will determine the dynamic behaviour of the template instances. Any request from the abstraction layer will return the parameters of the child elements in a dynamic way. Physical assets are digitally twinned through these templates and enable global changes to be applied to the entirety of assets linked to a template. For example, conducting template configuration changes for a sensor pressure tag in one template can update all pressure tags for every asset which is linked to the template without requiring code changes. Templates can contain anywhere from one to hundreds of thousands of linked assets or elements.

Figure 6:
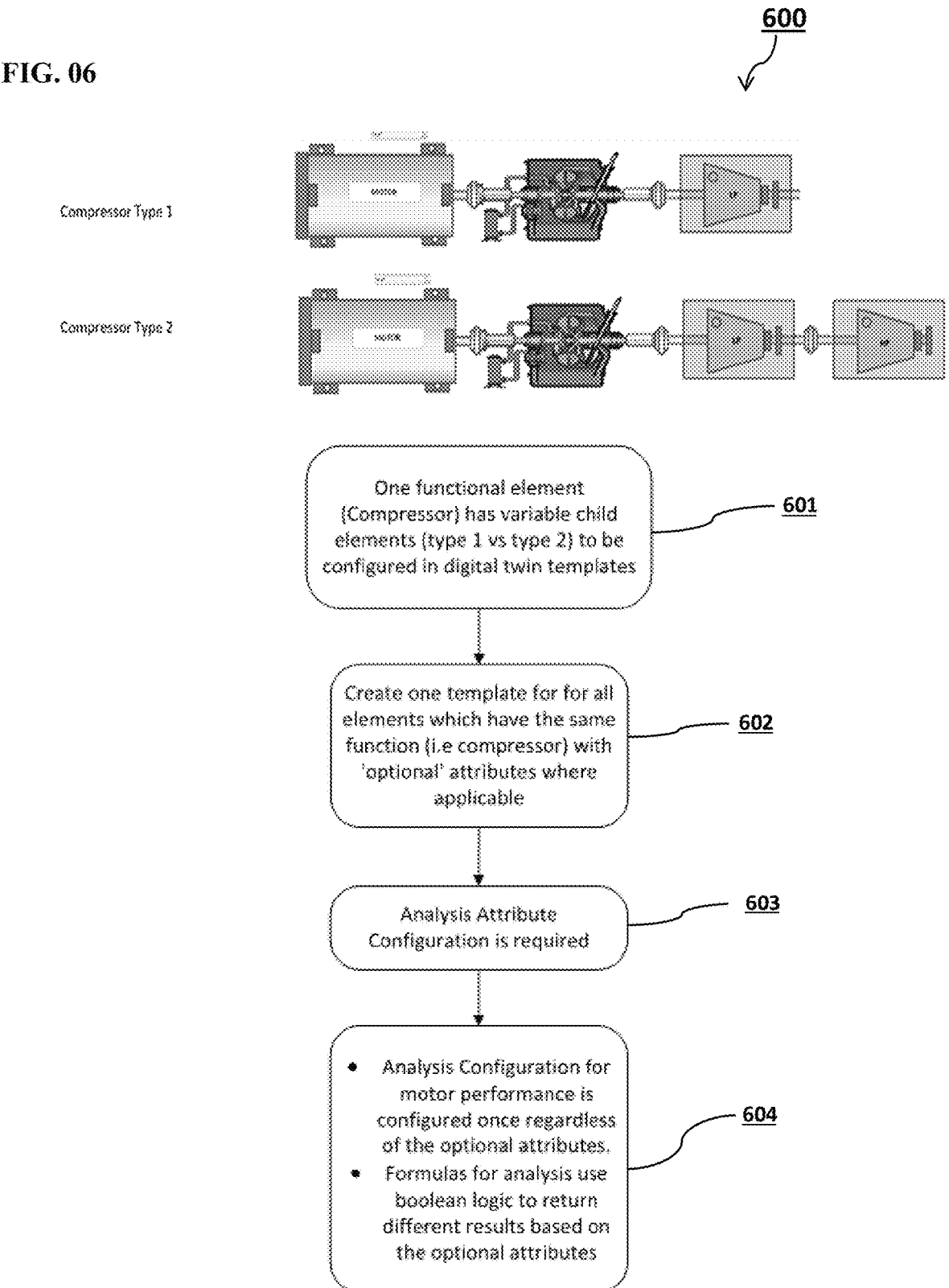
FIG. 06 shows system and method for optimizing physical asset data modelling. A digital twin is made through data templates to ensure standardization and efficient configuration. The digital twin consists of a root element and can have multiple layers of child templates, which are either mandatory or optional and can be dynamic in its number. The template rules will determine the dynamic behavior of the template instances. Any requests from the abstraction layer will dynamically return the parameters according to the configured data-model.
Figure 7:
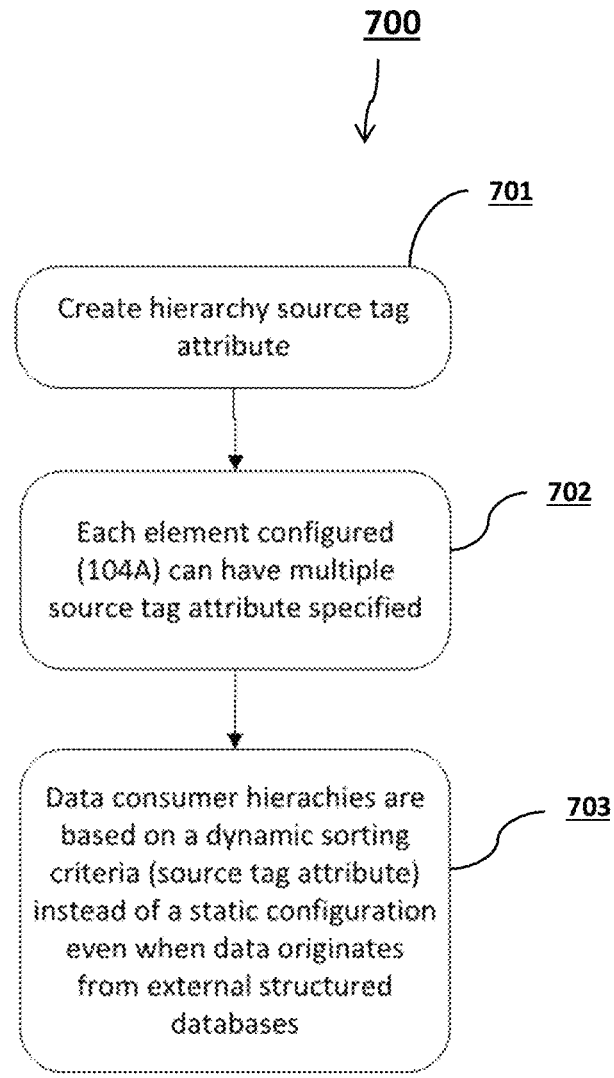
FIG. 07 system and method to support single data source for multiple disciplines towards becoming a golden record. In a multidisciplinary organization, the same assets are being monitored within different contexts and purposes and through different systems and databases. To serve these different purposes, most of the time there are different hierarchies required to enable the right analysis for a discipline. This can have its repercussions on the data integration to keep an asset only once in the data base to ensure the single version of the data (truth) is been given to different audience. To enable this, the same record can be tagged to different hierarchies. Alternatively, in instances where multiple records may exist for a common data point, mechanisms are in place to ensure the golden record can be emphasized without having to remove other sometimes relevant records from the data model.

As an example, a compressor is a root element but will have a number of high-level component template such as a drive and a compression stage. A compressor cannot run if there is no drive available so this would be a mandatory child, which has all the different parameters of the drive. When a new instance of a compressor is created, the drive will be a mandatory element to be configured. Similarly, the compression stage is mandatory but there might be compressors with more than one stage. The present invention offers the option to combine all templates (all templates for a same type of equipment having different model types) by specifying exactly which components (attributes) of the templates are mandatory and which are optional as depicted in FIG. 06. This also provides complete flexibility to users with appropriate credentials to configure the templates to be an exact replication of their operational conditions. With the knowledge of which components (attributes) are mandatory, the present invention can provide functionalities much more efficiently. Using visualization as example, the compressor templates can be selected to view mandatory and optional outputs (if they are available) in the same trend. When creating formulas for analysis used in the context of exception-based surveillance for example, an analysis is created for the compressor template, the formula can automatically check all specified attributes taking into consideration optional attributes.

To create the initial data-mapping (when the solution is first deployed and is configured for the first time), data mapping would take three times longer to do in this scenario as attributes configuration would be unnecessarily duplicated across three templates instead of one common templates (in the cases of mandatory attributes). By configuring attributes that are common for all compressors in one template, the process efficiency is significantly improved. This simple principle/method applies to subsequently configuring applications or functionalities within the present invention based on that initial data mapping. For example, if it is required to create an analysis formula to trigger an exception when a sensor pressure tag reads values that fall below a predefined threshold, it would require this to be configured multiple separate times using conventional hierarchy and template methods while the same result could be achieved by doing it only once through the present invention's methodology for handling hierarchies and templates.

It is also essential to highlight that creating a visualization of assets (digital-twin) is transformed as a result of this dynamic approach because the flexible template model can dynamically influence the visual output on an individual element basis depending on the components (attributes) that are available for a given piece of equipment. Digital-twins may be required to feature digital representations of their physical properties which may vary for different equipment types having the same basic function (compressors with different number of stages). For example, instead of having a representative image graphically rendered for each compressor type, compressor components are generated on the basis of the attributes available within the template for an ad-hoc compressor element and can therefore create a 'digital-twin' image that perfectly represents differences between each piece of equipment that belongs to the same template and as demonstrated by FIG. 06. Therefore, the methodology of the present invention ensures that single version-of-the-truth is achieved by enabling configuration where required through optional attributes and, locking-in essential attributes through mandatory attributes. As an example, asset A has compressors of type A while asset B has compressors of type B. Both compressors are of different models and monitoring different sets of parameters. However, a user may want to view the input/output of both types of compressors aggregated. To achieve this, they can specify which inputs/outputs for both types of compressors are 'Mandatory' and need to be configured and which parameters are optional and can be configured at the discretion of each operational group asset.

In a preferred embodiment of the present invention, a computer implemented method (600) for data collection, integration and presentation is disclosed. The method (600) comprises of digital-twins that have one functional element and several variable child elements that are configured within the digital twin templates (601), wherein one template is created (602) for all elements which have the same function with optional attributes where applicable, analysis (603) attribute configuration is configured at least one time without being impacted by other optional attributes, and different results based on the optional attributes are returned by using Boolean logic (604).

Figure 2:
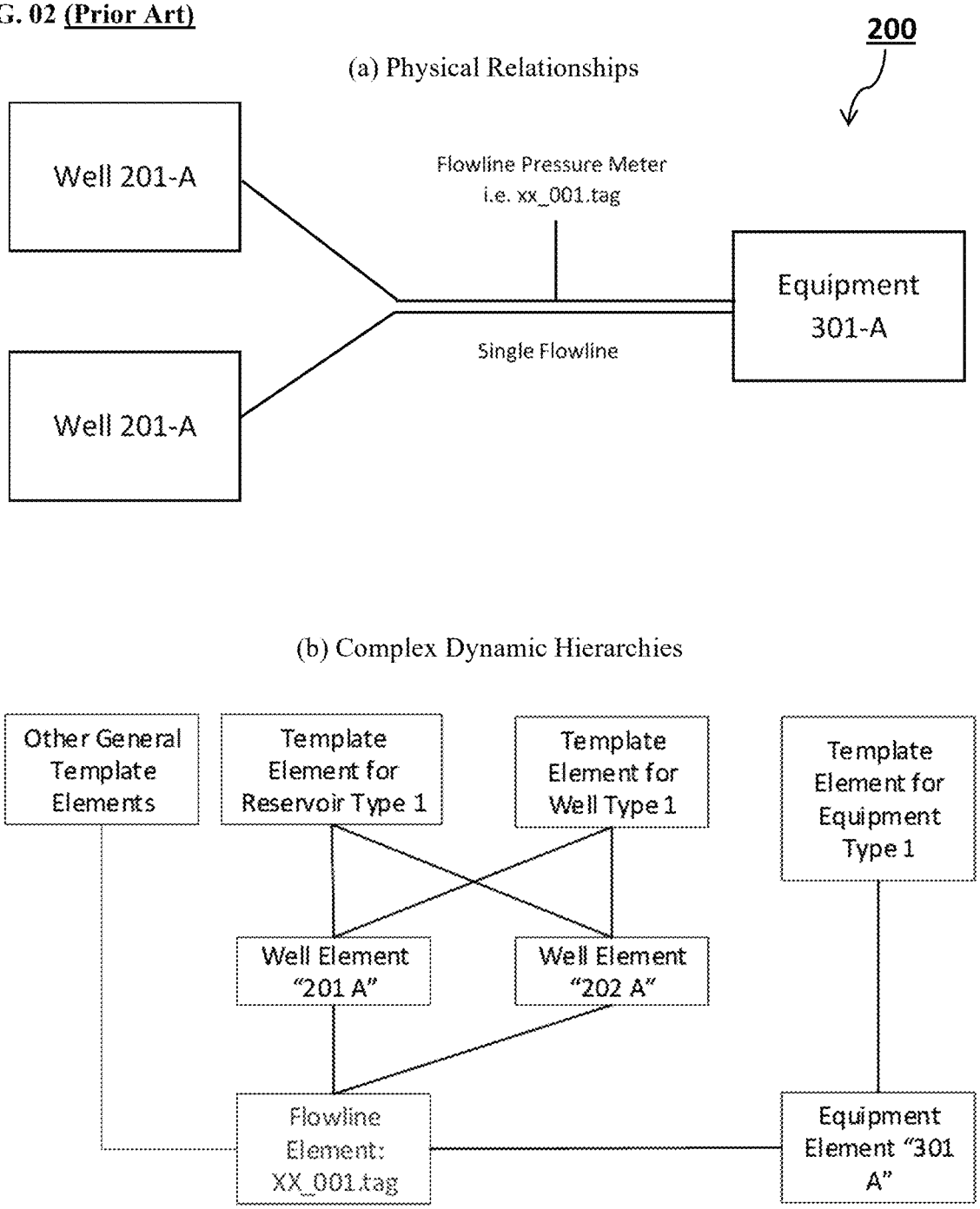
FIG. 02 shows an example of traditional asset data model (tagging) that used in some prior art references where two wells (201-A and 202-A) are connected through a single flowline to an equipment (301-A). A pressure sensor is set to read and collect data on said flowline. In a traditional hierarchy, the flowline pressure sensor reading can be a child element to a parent element such as 'Well 201-A or 202-A', however when viewing element properties individually, users may not be aware that the flowline pressure is also affected by the fluctuations in pressures from the other well as they are not 'connected'. This presents challenges in creating platform functionalities which are capable of including considerations for complex multi-directional relationships that exists between physical assets for analysis, workflow management and visual reporting. The drawing (b) demonstrates how this challenge can be addressed by embedding dynamic tagging functionalities within the platform so that the digital representation of a physical asset's complex relationships can be represented accurately. Between each asset, there is can be a flow of liquids or gases that are being continuously processed and where it is now possible to provide users with the data-model needed to understand how these different flows are changing across physically connected asset nodes within the production system according to the complex relationship modelled.

Another preferred embodiment of the present invention is integrated asset hierarchy. FIG. 02 (A) shows an example of a challenge encountered by traditional asset data models (200) that is used in some prior art references, and where two wells (201-A and 202-A) are connected through a single flowline to an equipment (301-A). A pressure sensor is set to read and collect data on said flowline. As shown in this system (200), two wells (201-A and 202-A) are connected to the same flowline and the flowline pressure has a 'tag' that is being managed by any third-party system. The flowline pressure tag then should manually be added twice under each well in a traditional hierarchy method. Such a conventional method provides users with an incomplete and inaccurate digital-twin structure because if, for example, a problem occurs with well (202-A) which affects flowline data and the user is visualizing data for well (201-A), the viewer will not have the complete understanding of what is happening to the flowline and won't be able to conclude on a potential root-cause as there can be multiple root-causes.

On the other hand, the present invention, as shown in FIG. 02 (B), offers the capabilities to create complex network of connections and relationships that enable a holistic and realistic overview of the relationships that physically exists between multiple datasets. The present example is considered simple and straightforward, but it becomes much more complex when it comes to generating dynamic hierarchies and corresponding tags that become the basis for other platform functionalities or applications, which can include for example, generating dynamic limit diagrams to show integrated production system constraints. In the oil and gas industry, production is always bound by the most important bottleneck or constraint (i.e. water, oil or gas). Therefore, dynamic monitoring and understanding of these bottlenecks becomes a critical competitive advantage to be leveraged. Manual and static hierarchies are suitable for small production size with limited numbers of production units. However, for large-scale operations where there is a continuous flow of millions of data-points to be aggregated, using static hierarchies would not be suitable for complex functionalities such as generating such limit diagrams.

In a multidisciplinary organization, the same physical assets are being monitored within different contexts, purposes and disciplines. To serve these different groups, there are different hierarchies required to enable the right analysis for a given discipline or purpose. This can have repercussions on the data integration to keep an asset only once in the database and ensure a single version-of-the-truth manageable for the different targeted audiences. To enable this, the single root record instances can be linked to different hierarchies simultaneously. Using the oil and gas industry as an example, a single well (201-A or 202-A) might be viewed through different hierarchies. For operational roles, users will be viewing at their wells by field, while reservoir engineers want to view the well by reservoir/formation and a communications engineer would require to view the same well according to the wireless communication tower they are routed through.

Hierarchies are used to manage data access to virtualized data from scattered organizational data sources. The vast majority of databases that are used for such purposes are 'structured', meaning that they have column and row references to reference them in logical table. In such structures, one 'attribute' belonging to multiple hierarchies needs to be duplicated in every hierarchy (column) where it belongs, and modified accordingly in each 'hierarchy' when a change is made. Alternatively, there are unstructured databases (commonly the case in 'data lakes') that essentially store data with 'tags' as opposed to the structured method. An example of this unstructured approach would be 'graph tables'. The present invention is capable of retrieving (virtualize) data from structured tables and systems and treat the output as if it were coming from a graph table as to allow the easy manipulation of data across different requirements in the platform. This allows populating multiple entries from multiple scattered structured tables into multiple dynamic hierarchies to the end-users of the platform. Therefore, instead of duplicating structured hierarchies, the present invention changes the references so they can be treated as tagged references.

Most often, the same element can have multiple records having the same core function but holding different values within one or multiple database(s). Through data collection, when multiple read/write queries are combined, the present invention adds a lookup function method that is able to aggregate the various n records across different databases despite their different data conventions, and enables the functionality for the user configure the select or correct the 'golden record' (the record which deemed to be the most accurate for the context). As a generic example, if you were to enter a country name into the search query, results must be generated from the data source, while the unique identifiers to show a list of countries might come from a different data source. Unique element identifiers in scattered database systems cause data integrity problem which are resolved through this elevated golden record which is verified and controlled by users. Then, when writing back, data can be sent with the same correct reference to the source offering "collaboration" or integrity between different systems. End-users now have the flexibility in matching the correct source with the correct data when required. Through this concept, the right data is being mapped to the right hierarchies (and as a consequence, templates) ensuring that this approach to dynamically manage hierarchies for multiple disciplines can work when managed from an end-user platform layer.

The present invention can retrieve and virtualize these 'records' which could also be called 'elements' in this context, and manage them so that one 'record' can be shown in multiple hierarchies/groups. This concept is derived from "Graph database" where "the graph relates the data items in the store to a collection of nodes and edges, the edges representing the relationships between the nodes. The relationships allow data in the store to be linked together directly and, in many cases, retrieved within one operation. Graph databases hold the relationships between data as a priority. Querying relationships become fast because they are perpetually stored in the database. In addition, relationships can be intuitively visualized, making them useful for heavily inter-connected data". Therefore, the present invention treats multiple scattered non-graph databases as if they are graph databases through the data abstraction layer, then elevating the output configurability to end-users. Moreover, the source database hierarchy can be 'mixed-and-matched' to other hierarchies by using methods similar to graph databases but again, without the database being a graph database.

In a preferred embodiment of the present invention, a computer implemented method (700) for data collection, integration and presentation is disclosed. The method (700) comprises of creating a hierarchy of source tag attributes (701); and configuring (702) digital-twin elements to have multiple source tag attributes; wherein data consumer hierarchies comprising of dynamic sorting criteria for all sorts of data originating from data warehouse and external structured databases (703), and said data integration layer keeps unified digital twin attributes in the database ensuring that the same version of information is exchanged with search and read queries.

The present invention also features a no-code method that utilizes a visual development environment to allow nonprofessional users to create apps, through methods such as drag-and-drop, adding application components to create a complete application. This no-code method allows users with limited prior coding knowledge to create apps. The present invention provides a complete set of tools to enable different no-code functions to cover the entire cycle of creating an application as well as managing workflows (business processes), user mapping, exception-based surveillance logic configuration, and configuring the data-model.

Typically, in conventional no-code or low-code platforms, data from multiple sources are imported and copied into the application database so that they can be subsequently used by users to create new functionalities. However, the present invention provides a no-code environment in addition to the data abstraction layer that help elevating complex and coded data abstraction layers to the end-users so they can configure functionalities without the need to replicate data in the database and leverage the virtualization capabilities. No-code environments typically run from their own internal database and have to import data before the data can be used within their applications for no-code purposes. However, in the present invention, this gap is bridged as the data abstraction layer can virtualize and connect to organizational databases without needing to import the data in the first place. An interface is available to the users in order to configure/manage these connections resulting in a complete end-to-end no code environment/platform.

In other conventional database management methods designed for professional IT administrator contexts, users utilize a hard-coded forms that provides them with the ability to 'manipulate' a database through pre-defined queries. The only way these forms can be changed is by modifying the code on which it runs. The hard-coding for such a form would take an expert developer days of work to generate a stable query process which is not configurable. However, the present invention provides a user-friendly interface and methods to handle such issues. For instance, as shown in FIG. 08-B, users can use the no-code interface (800-2) to choose from a multitude of pre-established connections available in the data-mapping row. A number of parameters can be specified that would typically be hard-coded. When a variety of different elements are linked to the same 'template' (801), a single 'attribute' (child of an element) query can be configured which will be replicated for all elements based on the element name. The element name in the present invention does not necessarily need to be a match for the element name in the databases where the query will be operating. This also means that new equipment (elements) and their 'attributes' being added to the platform can be automatically configured through a standardized platform configuration workflow which guides users on the various steps needed to be taken to finalize the addition. The present invention offers a hard-coded pre-configuration data-model so that the actual configuration can be codeless.

In a preferred embodiment of the present invention, a computer implemented method (800-1) for data mapping, the method (800-1) comprising: providing a multitude of pre-established connections as a low-code tools in a data mapping row; inserting (801) new features and/or changes in the application; checking (803) whether the data required is from a database source which is already configured in the application; utilizing (804) said low-code tools to configure new functionalities for the data that is already configured in the application; configuring new connections (805) with the database for the data that is not configured in the application; adding (806) new data in the application using the data configuration tools and through virtualization and control performance parameters; and using (807) of low-code toolkit readily available in application to create new functionality.

The invention claimed is:

1. A computer implemented method for data collection, integration and presentation, comprising:
   providing a data warehouse, a data abstraction layer, a data integration layer, and a graphical user interface, wherein a set of information is exchanged between said data warehouse and said data abstraction layer, and between said data abstraction layer and said data integration layer;
   storing time series and relational data points collected from physical assets in said data third-party data warehouses or source databases;
   configuring collected data points into digital twins each representing a physical asset;
   running queries to request a single bulk of data through a data abstraction layer that is integrated to a data consumer;
   combining queries into a query bulk to reduce the request frequency of the application programming interface;
   utilizing said query bulk to fetch and stream asynchronous records from said abstraction layer to said data consumer;
   enabling the presentation of multiple asynchronous events and streaming of said events to the data consumer; and
   displaying a graphical representation of said multiple asynchronous events using said graphical user interface,
   wherein said data consumer performs the following steps:
   providing a set of read and write queries,
   generating a read query to collect data from an organizational data warehouse to provide analysis and reports;
   generating a write query to change the records obtained by said read query wherein such query is configured to change the records in the source application database;
   showing updated records through a new read query; and
   re-routing said read query automatically to trigger the new read query to the source application database instead of the data warehouse, such that corrected and updated records are returned to the data consumer.

2. The method of claim 1, further comprising:
   recording changes to time series-data or relational records that represent a plurality of physical assets in a database;
   accessing said database to generate new tags to physical assets replacements;
   verifying whether said new tags have the same function and role as those stored in the data warehouse;
   configuring said new tags through a new attribute version identifier when new tags have the same function and role as those stored in the data warehouse, and binding all data from different attribute versions identifiers to report the complete dataset; and
   configuring said new tags through a new attribute identifier when said new tags do not have the same function and role as those stored in the data warehouse, and reporting changes to time-series data points for a single attribute identifier.

3. The method of claim 1, wherein said digital twins comprising one functional element and several variable child elements that are configured within the digital twin templates, wherein one template is created for all elements which have the same function with optional attributes where applicable, analysis attribute configuration for motor performance is configured at least one time without considering other optional attributes, and different results based on the optional attributes are returned by using analysis formulas.

4. The method of claim 1, further comprising:
   creating a hierarchy of source tag attributes; and
   configuring said digital twin elements to have multiple source tag attributes; wherein data consumer hierarchies comprising of a dynamic sorting criteria for all sorts of data originating from data warehouse and external structured databases, and
   said data integration layer keeps unified digital twin attributes in the database ensuring that the same version of information is exchanged with search and read queries.

* * * * *